US005089160A

United States Patent [19]

Pallone et al.

[11] Patent Number: 5,089,160

[45] Date of Patent: * Feb. 18, 1992

[54] AEROSOL PREPARATIONS FOR REMOVING LINT, HAIR AND OTHER PARTICULATE MATTER FROM FABRIC

[75] Inventors: Thomas J. Pallone, South Barrington; Larry J. Alania; William C. Weber, Jr., both of Naperville; Robert F. Farmer, Barrington, all of Ill.

[73] Assignee: Alberto-Culver Company, Melrose Park, Ill.

[ * ] Notice: The portion of the term of this patent subsequent to Feb. 5, 2008 has been disclaimed.

[21] Appl. No.: 421,961

[22] Filed: Oct. 16, 1989

[51] Int. Cl.[5] ........................ C11D 17/00; C09K 3/22; B01J 3/00; C08J 9/00

[52] U.S. Cl. ........................................ 252/90; 252/88; 252/174.23; 252/174.24; 252/304; 252/307; 252/308; 15/104 A; 521/78

[58] Field of Search ...................... 252/88, 90, 174.23, 252/174.24, 304, 307, 308; 15/104 A; 521/78

[56] References Cited

U.S. PATENT DOCUMENTS

| | | | |
|---|---|---|---|
| 2,716,637 | 8/1955 | Bunting | 106/171 |
| 2,759,860 | 8/1956 | Pallos . | |
| 3,305,510 | 2/1967 | Gander et al. . | |
| 3,305,513 | 2/1967 | Gander et al. . | |
| 4,328,319 | 5/1982 | Osipow | 521/78 |
| 4,350,774 | 9/1982 | Scotti et al. | 521/78 |
| 4,381,066 | 4/1983 | Page et al. | 521/78 |
| 4,422,877 | 12/1983 | Spitzer et al. | 521/78 |
| 4,497,919 | 2/1985 | Varga et al. | 252/8.57 |
| 4,510,640 | 4/1985 | Omori | 15/104 A |
| 4,810,407 | 3/1989 | Sandvick | 252/90 |

*Primary Examiner*—A. Lionel Clingman
*Assistant Examiner*—William S. Parker
*Attorney, Agent, or Firm*—Tilton, Fallon, Lungmus & Chestnut

[57] ABSTRACT

A packaged aerosol preparation is provided for use in removing lint, hair and other particulate matter from fabrics. The sprayable liquid composition is packaged in a valve-equipped aerosol container. The composition includes an acrylic polymer or copolymer resin, a tackifier or plasticizer, and a liquified propellant consisting of either dimethyl ether or a mixture of dimethyl ether with a hydrocarbon propellant. The composition can be applied to absorbent substrates such as paper towels to provide an effective, disposable removal device.

3 Claims, No Drawings

AEROSOL PREPARATIONS FOR REMOVING LINT, HAIR AND OTHER PARTICULATE MATTER FROM FABRIC

FIELD OF INVENTION

The field of this invention is the removal of particulate matter such as lint or hair from fabric other than by washing or dry cleaning. Preparations and devices within the field of the invention include those which can be employed for quick removal of particulate matter from the surface of a garment while the garment is being worn or immediately prior thereto.

BACKGROUND OF INVENTION

It is known to impregnate or coat cloth, paper, or other sheet material with a tacky adhesive, and to applying the impregnated or coated sheet material to a garment from which it is desired to remove lint or hair. Illustrative U.S. Pat. Nos. include 1,468,380, 3,682,690, 4,557,011, 4,575,890, and 4,713,274. As described in patent 3,682,690, a roller may be coated with a tacky elastomer which is water-washable, thereby permitting the particulate matter collected by the roller to be removed by washing. U.S. Pat. Nos. 4,557,011 and 4,575,890 utilize a series of separately detachable adhesive sheets which are supported on a roller for applying to the garment. After the outer sheet on the roll has picked up the lint or hair, it then must be removed, exposing a fresh sheet.

U.S. Pat. No. 4,713,274 describes a pad having a plurality of removable sheets which are coated with an adhesive material for use in collecting particulate matter. U.S. Pat. No. 4,820,558 describes an envelope formed from plastic sheets having the outer surfaces of the sheets coated with an adhesive material suitable for collecting particulate matter. A hand may be inserted within the pocket formed by the sheets for applying the device.

As far as is known, no one has heretofore proposed the use of an aerosol adhesive spray for removing particulate matter. U.S. Pat. No. 2,759,860 describes a lint removing method in which a liquid composition is applied to the bristles of a brush or whisk broom. The brush or whisk broom after coating with the composition is brushed over the surface of the garment.

Aerosol adhesive formulations are known. In general, they consist of a film-forming resin, a tackifier or plasticizer therefor, and an aerosol propellant in which the resin is soluble or readily dispersible. On application to sheet material, such as the backs of photographs, the spray forms a tacky, adherent coating. Such formulations include acrylic polymers such as the methacrylate polymers employed with volatile aerosol propellants as disclosed in U.S. Pat. No. 3,305,510. As there described the alkyl acrylate polymer may be modified so that it is water-washable to facilitate removal of misapplied spray. The patent indicates that dimethyl ether can function both as a propellant and solvent for acrylate polymers. U.S. Pat. No. 3,340,090 describes an aerosol-packaged spray adhesive formulated from an elastomeric polymer together with a resin. The spray composition is intended to form a tacky coating.

SUMMARY OF INVENTION

In the development of this invention, it was found that previously-known aerosol adhesive compositions were not satisfactory for use in removing particulate matter from fabrics. It was determined that aerosol preparations for this purpose should have special characteristics not heretofore required for aerosol adhesive compositions. Accomplishing the desired results requires selection of the resin in relation to the propellant/solvent and other formulation considerations.

An important requirement of the aerosol preparations of this invention is that they can be employed with readily available substrates such as paper towels. Although towel paper is highly absorbent, because of the limited amount of spray applied, and the deposit of the spray in the form of droplets or globules, the deposited adhesive material will remain on the surface of the towel paper, and thereby function effectively for removal of hair, lint, etc.

In the event of misapplication of the sprayed composition, such as on the hands, or unintentional application to a garment, it is desirable to have the tackified resin readily water-washable. A surfactant is incorporated in the formulation to promote water-removability.

Preferred formulations for the purpose of this invention utilize acrylic polymers as the film-forming resin together with tackifiers, such as rosin-type tackifiers or acrylic tackifiers. In one embodiment, the sole propellant is dimethyl ether. In other embodiments, the propellant system comprises a mixture of dimethyl ether and a hydrocarbon propellant of suitable volatility such as n-butane, isobutane, propane, or mixtures thereof.

In forming the desired type of deposit on the substrate to which the composition is applied, it has been found advantageous to utilize the resin in the form of aqueous latex emulsion. Excellent results are obtained with an acrylic latex emulsion. Anhydrous compositions can also be used, such as those employing organic solvent solutions of the resin. With anhydrous formulations, it is especially important to control the spraying of the composition in order to achieve globular-type surface deposit and to avoid the formation of a continuous coating.

DETAILED DESCRIPTION

In accordance with the present invention, a specially formulated adhesive composition is prepared in a valve-equipped aerosol container. The composition comprises an adhesive film-forming resin in admixture with a tackifier, and a volatile aerosol propellant in which the tackified or plasticized resin and/or rosin is soluble or readily dispersable. Suitable resins include acrylic polymers and co-polymers such as acrylic vinyl copolymers. Alkyl acrylate or alkyl methacrylate polymers can be used. Such acrylic resin polymers are available commercially from a number of sources, as indicated subsequently.

The acrylic polymers may be used either as an aqueous latex emulsion or as an organic solvent solution. It has been found, however, that acrylic latex emulsions are especially advantageous for producing a coating in the form of a splattered globules which remain on the surface of even highly absorbent substrates such as towel paper. Organic solvent solutions of acrylic polymers in essentially anhydrous compositions can also be used, providing that the spraying is carefully controlled to produce the desired type of deposit.

For purpose of the present invention, it is desirable to employ a tackifier in combination with the film-forming resin. The sprayed globules should have a tacky adhesive character. Rosin-type tackifiers are useful for this purpose, such as rosin polyol esters, modified tall oil rosins, glycerol esters of resin, etc. In certain embodiments, the may itself be a modified film-forming resin, such as modified acrylics which function as tackifiers.

The propellant or propellant systems should be selected to provide rapid evaporation on spraying of the composition. The solubility or dispensability of the tackified or plasticized resin in the liquefied propellant is also an important consideration. The individual propellant or the components of the mixture should each have a volatility producing a vapor pressure of 10 psig at 70° F. Preferred solvents are dimethyl ether, or a mixture of dimethyl ether with a hydrocarbon propellant such as propane, n-butane, isobutane or mixtures thereof. For example, a mixed propellant may contain from 30 to 75 parts by weight of a butane propellant (preferably n-butane) together with 70 to 25 parts of dimethyl ether. Such combinations may produce a lower cost propellant, but for optimized embodiments it is preferred to employ dimethyl ether as the sole propellant, especially with acrylic latex emulsions. Anhydrous systems using organic solvent solutions of acrylic polymers or copolymers (e.g., acrylic vinyl copolymers) can be used more effectively with the combinations of dimethyl ether and hydrocarbon propellants.

The propellant system should also act as an effective solvent for the other ingredients, especially the resin and tackifier. However, a single phase system is not essential if the phases are readily redispersible on shaking the container. It is desired to dispense an essentially homogeneous composition.

To promote water-washability of the applied composition (free from propellant/solvent), a surfactant is preferably incorporated in the aerosol formulation. Suitable surfactants include sorbitan monolaurate, alkylbenzene sulfonate, octylphenoxy polyethoxyethanol, and similar surfactants.

Preferred compositions based on acrylic polymers are set out below, Composition A using an acrylic polymer latex, and Composition B being an anhydrous formulation.

| Ingredients | Parts by Wt. |
|---|---|
| Preferred Composition A | |
| Film-forming resin | 1.00 to 12.00 (100% solids) |
| Tackifier/Plasticizer | 1.00 to 7.00 |
| Propellant/Solvent | 78.00 to 99.00 |
| Surfactant | 0.30 to 3.00 |
| Acrylic Polymer Latex (50% aqueous) | 4.00 to 10.00 |
| Rosin and/or Modified Acrylic Tackifier | 1.23 to 2.33 (100% solids) |
| Dimethyl Ether | 30.00 to 87.00 |
| n-Butane | 0.00 to 55.00 |
| Surfactant | 0.77 to 2.00 |
| Preferred Composition B | |
| Acrylic Vinyl Copolymer (Organic Solvent Solution) | 5.0 to 15.00 |
| Elastomeric Tackifier (e.g., Polybutene) | 1.0 to 5.00 |
| Dimethyl Ether | 25.00 to 94.00 |
| n-Butane | 0.00 to 60.00 |
| Surfactant | 0.50 to 2.00 |

Composition A preferably contains both a rosin tackifier such as a rosin polyol ester and a modified acrylic tackifier. In Composition A, the preferred propellant consists essentially of only dimethyl ether. With respect to Composition B, the tackifier for the acrylic vinyl copolymer is preferably polybutene, and the propellant/solvent is preferably a mixture of dimethyl ether and n-butane, such as a mixture containing from 30 to 75 parts by weight of n-butane together with 70 to 25 parts of dimethyl ether. In certain embodiments, the combination of an acrylic vinyl copolymer and an acrylic polymer can be used in admixture with a propellant comprising a mixture of n-butane and dimethyl ether. If desired, the acrylic polymer used with the acrylic vinyl copolymer can be an acrylic latex.

To avoid the possibility of corrosion, it is usually not desirable to employ tinplate aerosol containers with formulations like Composition A which contain moisture. With such non-anhydrous compositions the containers can be made of aluminum. Tinplate containers are less expensive than aluminum containers. This can provide a cost advantage for formulations like Composition B. However, formulations like Composition A have the functional advantage of more controllably producing a globular-type spray deposition.

The preparations of this invention can be used with a variety of flexible sheet materials which provide essentially non-shedding surfaces for receiving the spray. Towel paper is a preferred substrate because of its ready availability and because the absorbent character of the paper does not interfere with the production of the desired globular-type coating if carried out in accordance with the method steps of this invention. Other readily available substrates include polyethylene bags, such as sandwich or food storage bags, as well as other non-absorbent sheet material like waxed paper, aluminum foil, etc. Alternatively, cloth formed from cotton, wool, or synthetic fibers can be used as a substrate.

In applying the aerosol composition to the substrate, a short spray time should be used in order to promote an uneven, globular, discontinuous surface deposit. For example, at spray distances of from 8 to 12 inches, spraying times of 1 to 5 seconds are employed for up to each square foot of sprayed area. For example, a paper towel sheet having a surface area of up to about one square foot can be used. More specifically, at a normal spray distance of 8 to 10 inches, a spray time of 2 to 4 seconds produces the surface deposition desired for use in removing lint or hair from fabric.

Because of the volatility of the propellant/solvent, it largely dissipates in transit. Residual solvent substantially evaporates in 30 to 60 seconds following deposition. In preferred embodiments, the substrate is ready for use in less than 30 seconds following the deposition.

If the length of the spraying time is increased beyond 5 seconds, there is a greater tendency for the deposited film-forming composition to produce a continuous coating. Such coatings may contain residual solvent which will tend to promote absorption of the coating by absorbent substrates such as towel paper. Further, when applied to non-absorbent surfaces such as polyethylene bags, there is a greater tendency for the deposited material to transfer to the garment being treated. It is desirable to avoid spray applications which produce continuous coatings as the spray is deposited.

If on use of a deposit-bearing substrate it is found to be insufficiently tacky or to have an insufficient amount of deposited globules for effective removal of lint or hair, the substrate can be resprayed providing the spraying limitations above are followed.

Formulations for use in practicing the method of this invention are further illustrated by the following examples. Commercial sources of the ingredients are keyed by reference letters to a later presented table. Examples 1 to 6 and 10 are latex emulsion formulations. Examples 7 and 9 are anhydrous formulations.

EXAMPLE 1

| Ingredients | % w/w |
|---|---|
| Concentrate: | |
| Ucar 175 (Acrylic Polymer Latex) (50% Aqueous)[a] | 8.940 |
| Duro-Tak 80-1211 (Modified Acrylic (Solution) (44% Solids)[b] | 5.078 |
| Unitac R40 (Rosin Polyol Ester)[c] | 0.080 |
| Triton X100 (Octylphenoxy Polyethoxy-ethanol)[d] | 0.894 |
| Isopropanol | 0.008 |
| Propellant/Solvent: | |
| Dimethyl Ether[e] | 85.000 |
| | 100.000 |

Manufacturing Procedure

Charge manufacturing tank with Duro-Tak. Begin mixing. Add Unitac/IPA blend. Add Triton. Increase mixer speed. Slowly add Ucar 175. Adjust to pH=7.00 with TEA.

Charge a 53 mm×184 mm aluminum aerosol container with 31.8 grams of above blended concentrate. Add 180.2 grams Dimethyl Ether propellant to a pressure of 63–80 psig.

EXAMPLE 2

| Ingredients | % w/w |
|---|---|
| Concentrate: | |
| Ucar 175 (Acrylic Polymer Latex) (50% Aqueous)[a] | 10.000 |
| Duro-Tak 80-1211 (Modified Acrylic Solution)[b] | 2.840 |
| Triton X100 (Octylphenoxy Polyethoxy-ethanol)[d] | 2.000 |
| Propellant/Solvent: | |
| Dimethyl Ether[e] | 85.160 |
| | 100.000 |

Manufacturing Procedure

Charge manufacturing tank with Duro-Tak. Begin mixing. Add Triton. Increase mixer speed. Slowly add Ucar 175.

Charge a 38 mm×107 mm aluminum aerosol container with 11.9 grams of above blended concentrate. Add 68.1 grams Dimethyl Ether propellant to a pressure of 63–80 psig.

EXAMPLE 3

| Ingredients | % w/w |
|---|---|
| Concentrate: | |
| Ucar 175 (Acrylic Polymer Latex) (50% Aqueous)[a] | 7.747 |
| Duro-Tak 80-1211 (Modified Acrylic Solution)[b] | 4.401 |
| Triton X100 (Octylphenoxy, Polyethoxy-ethanol)[d] | 0.775 |
| Unitac R40 (Rosin Polyol Ester)[c] | 0.077 |
| Propellant/Solvent: | |
| Dimethyl Ether[e] | 87.000 |
| | 100.000 |

Manufacturing Procedure

Charge manufacturing tank with Duro-Tak. Begin mixing. Add Unitac. Add Triton. Increase mixer speed. Slowly add Ucar 175.

Charge a 45 mm×165 mm aluminum aerosol container with 18.1 grams of above blended concentrate. Add 120.9 grams Dimethyl Ether propellant to a pressure of 63–80 psig.

EXAMPLE 4

| Ingredients | % w/w |
|---|---|
| Concentrate: | |
| Ucar 175 (Acrylic Polymer Latex) (50% Aqueous)[a] | 8.8262 |
| Duro-Tak 80-1211 (Modified Acrylic Solution)[b] | 5.0702 |
| Unitac R40 (Rosin Polyol Ester)[c] | 0.1113 |
| Unirez 1085 (Zinc Resinate)[c] | 0.1000 |
| Triton X100 (Octylphenoxy Polyethoxy-ethanol)[d] | 0.8923 |
| Propellant/Solvent: | |
| Dimethyl Ether[e] | 85.000 |
| | 100.0000 |

Manufacturing Procedure

Charge manufacturing tank with Duro-Tak. Begin mixing. Add Unitac, Triton. With increased mixer speed slowly add Ucar 175. Adjust to pH=7.00 with TEA.

Following Example 3, charge 31.6 grams of above concentrate into a 53 mm×184 mm aluminum aerosol container. Add 180.2 grams amount of Dimethyl Ether propellant to a pressure of 63–80 psig.

EXAMPLE 5

| Ingredients | % w/w |
|---|---|
| Concentrate: | |
| Ucar 175 (Acrylic Polymer Latex) (50% Aqueous)[a] | 8.90 |
| Duro-Tak 80-1211 (44%) (Modified Acrylic Solution)[b] | 5.00 |
| Unitac R40 (90% in IPA) (Rosin Polyol Ester)IPA[c] | 0.10 |
| Triton X-100 (Octylphenoxy Polyethoxy-ethanol)[d] | 0.80 |
| Triethanolamine | 0.20 |
| Propellant/Solvent: | |
| Dimethyl Ether[e]/n-Butane[k] (80/20 wt./wt.) | 85.00 |
| | 100.00 |

Manufacturing Procedure

Charge manufacturing tank with Duro-Tak. Begin mixing. Add Unitac R40. Add Triton X-100. Increase mixer speed. Slowly add Ucar 175. Adjust to pH=7.00 with Triethanolamine.

Charge a 53 mm×184 mm aluminum aerosol container with 31.8 grams of above blended concentrate. Add 63.6 grams Dimethyl Ether propellant via the under-the-cup technique. Add 180.2 grams of the preblended propellant mixture to a pressure of 63–80 psig.

EXAMPLE 6

| Ingredients | % w/w |
|---|---|
| Concentrate: | |
| Ucar 175 (Acrylic Polymer Latex) (50% Aqueous)[a] | 8.90 |
| Duro-Tak 80-1211 (44%) (Modified Acrylic Solution)[b] | 5.00 |
| Unitac R40 (90% in IPA) (Rosin Polyol Ester) | 0.10 |
| Triton X-100 (Octylphenoxy Polyethoxy-ethanol)[d] | 0.80 |
| Triethanolamine | 0.20 |
| Propellant/Solvent: | |
| Dimethyl Ether[e]/ | 30.00 |
| n-Butane[j] | 55.00 |
| | 100.00 |

Manufacturing Procedure

Charge manufacturing tank with Duro-Tak. Begin mixing. Add Unitac R40. Add Triton X-100. Increase mixer speed. Slowly add Ucar 175. Adjust to pH=7.00 with Triethanolamine.

Charge a 53 mm×184 mm aluminum aerosol container with 31.8 grams of above blended concentrate. Add 180.2 grams of the preblended propellant. Then add 116.6 grams n-Butane propellant to a final pressure of 40–60 psig.

EXAMPLE 7

| Ingredients | % w/w |
|---|---|
| Concentrate: | |
| Aroset 1716-Z-66 (Acrylic Vinyl Co-Polymer)[f] | 7.50 |
| Indopol H-1500 (Polybutene)[h] | 1.00 |
| Sandopan LS-24 (Sodium Laureth-13 Carboxylate)[i] | 0.50 |
| Propellant/Solvent: | |
| n-Butane[j]/Dimethyl Ether (59/41 Blend) | 91.00 |
| | 100.00 |

Manufacturing Procedure

Following the above recipe, 0.63 oz. of concentrate blended together in the order indicated is added to a 29 lb/20 lb tinplate aerosol container of 202×700 dimensions. The propellant blend (6.37 oz.) is charged to the container using a standard filling technique.

EXAMPLE 8

| Ingredients | % w/w |
|---|---|
| Concentrate: | |
| Aroset 1716-Z-66 (Acrylic Vinyl Co-Polymer)[f] | 9.00 |
| Indopol H-1500 (Polybutene)[h] | 1.00 |
| Sandopan LS-24 (Sodium Laureth-13 Carboxylate)[i] | 0.50 |
| Aroset 1845-Z-45 (Acrylic Polymer)[f] | 1.00 |
| Propellant/Solvent: | |
| n-Butane[j]/Dimethyl Ether (41/59 Blend) | 88.50 |
| | 100.00 |

Manufacturing Procedure

Following the above recipe, 0.35 oz. of concentrate blended together in the order indicated is added to a 20 lb/20 lb tinplate aerosol container of 202×406 dimension. The propellant blend (2.65 oz.) is charged to the valved container.

EXAMPLE 9

| Ingredients | % w/w |
|---|---|
| Concentrate: | |
| Aroset 1710-Z-66 (Acrylic Vinyl Co-Polymer)[f] | 7.50 |
| Indopol H-1500 (Polybutene)[h] | 1.00 |
| Triton X100 (Octylphenoxy Polyethoxy-ethanol)[d] | 0.50 |
| Ucar Latex 175 (Acrylic Latex)[a] | 1.50 |
| Propellant/Solvent: | |
| n-Butane[j] | 89.50 |
| | 100.00 |

Manufacturing Procedure

Following the above recipe, 1.25 oz. of concentrate blended together in the order indicated is added to a 20 lb/20 lb tinplate aerosol container of 207.5×701 dimension. The propellant blend (10.75 oz.) is charged to the valved container.

EXAMPLE 10

| Ingredients | % w/w |
|---|---|
| Concentrate: | |
| Ucar 175 (Acrylic Polymer Latex) (50% Aqueous)[a] | 8.9330 |
| Duro-Tak 80-1211 (Modified Acrylic Solution)[b] | 5.0740 |
| Unitac R40 (Rosin Polyol Ester)[c] | 0.1114 |
| Triton X100 (Octylphenoxy Polyethoxy-ethanol)[d] | 0.8930 |
| Mazon R17A (68% Solids)[c] | 0.7000 |
| Triethanolamine | 0.2000 |
| Propellant/Solvent: | |
| Dimethyl Ether[e] | 84.0886 |
| | 100.0000 |

Manufacturing Procedure

Charge manufacturing tank with Duro-Tak. Begin mixing. Add Unitac R40. Add Triton. Increase mixer speed. Slowly add Ucar 175. Add Mazon R17A. Adjust pH=7.00 with Triethanolamine.

Charge a 202×700 50 lb/25 lb tinplate aerosol container with 34.2 grams of the above blended concentrate. Add 180.8 grams of Dimethyl Ether propellant to a pressure of 63.0–80.0 psig.

Commercial Sources a. Union Carbide Corporation (Danbury, Connecticut)
b. National Starch and Chemical Corporation (Bridgewater, N.J.)
c. Union Camp Corporation (Wayne, N.J.)
d. Rohm and Haas (Philadelphia, Pa.)
e. E. I. DuPont de NeMours & Company (Wilmington, Del.)
f. Ashland Chemical Company (Columbus, Ohio)
h. Amoco Chemicals Company (Chicago, Ill.)
i. Sandoz Chemicals Corporation (Charlotte, N.C.)
j. Aeropres Corporation (Sibley, La.)
k. Mazer Chemicals, Inc. (Gurnee, Ill.)

Use of Aerosol Formulations

Use of the foregoing aerosol formulations can be illustrated in relation to the spraying of a paper towel, which is a preferred, readily available substrate. One hand may be covered with a sheet of clean, dry paper towel, and the aerosol container held upright at about 8 to 10 inches from the towel sheet. Spraying may be carried out with a circular motion, the spraying being for about 2 to 4 seconds. Following spraying, the towel sheet is held for about 10 to 20 seconds before use, such as about 15 seconds. The sprayed side of the sheet is then used by patting it against the garment or other fabric item to lift hair, lint, etc. It is desirable to avoid wiping the fabric with the sprayed sheet. If needed, the same towel surface can be resprayed to accomplish additional or more complete removal of particulate material, providing the same spray procedure is used and the spraying is not continued or repeated until a continuous coating is formed on the sheet.

We claim:

1. A packaged aerosol preparation for applying to sheet materials to be used for removing lint, hair and other particulate matter from fabrics, comprising a valve-equipped aerosol container having a sprayable liquid composition therein, said aerosol container being adapted to dispense said composition as a globular spray, said composition on a parts by weight basis containing from 1 to 12 parts of film-forming resin selected from the group consisting of acrylic polymer and acrylic copolymer resins, 1 to 7 parts of a tackifier selected from the group consisting of acrylic and resin tackifiers effective with said resin, the amount of said tackifier being sufficient in relation to said resin to impart residual tackiness to the resin in propellant-free, solid condition, thereby making the resin effective for removal of lint, hair and other particulate matter from fabrics, from 0.3 to 3 parts of a surfactant effective to provide washability to said resin, and from 78 to 99 parts of a liquefied propellant selected from the group consisting of dimethyl ether and mixtures of dimethyl ether with a hydrocarbon propellant having a vapor pressure at 70° F. of at least 10 psig, said film-forming resin, tackifier and surfactant in propellant-free admixture providing a spray deposition of tacky, adherent globules.

2. The packaged aerosol preparation of claim 1 in which said film-forming resin is an acrylic polymer latex.

3. The packaged aerosol preparation of claim 1 in which said composition is essentially anhydrous, said propellant is dimethyl ether, said film-forming resin is an acrylic polymer, and said composition includes an acrylic tackifier.

* * * * *